United States Patent
Kosuge et al.

(10) Patent No.: US 9,224,539 B2
(45) Date of Patent: Dec. 29, 2015

(54) SOLID ELECTROLYTIC CAPACITOR AND METHOD FOR MANUFACTURING THE SAME

(71) Applicant: SANYO ELECTRIC CO., LTD., Osaka (JP)

(72) Inventors: Keiko Kosuge, Moriguchi (JP); Masahiro Ueda, Osaka (JP); Ryo Morioka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 14/013,683

(22) Filed: Aug. 29, 2013

(65) Prior Publication Data

US 2014/0063691 A1 Mar. 6, 2014

(30) Foreign Application Priority Data

Aug. 31, 2012 (JP) ................................. 2012-191235

(51) Int. Cl.
*H01G 9/00* (2006.01)
*H01G 9/025* (2006.01)
*H01G 9/028* (2006.01)
*H01G 9/15* (2006.01)

(52) U.S. Cl.
CPC ............. *H01G 9/025* (2013.01); *H01G 9/0036* (2013.01); *H01G 9/028* (2013.01); *H01G 9/15* (2013.01)

(58) Field of Classification Search
USPC ......... 361/523, 516–519, 525, 528, 529, 530, 361/535–536
See application file for complete search history.

(56) References Cited

U.S. PATENT DOCUMENTS

2008/0316680 A1* 12/2008 Iida et al. ...................... 361/523
2010/0053848 A1* 3/2010 Kikuchi et al. ............... 361/523

FOREIGN PATENT DOCUMENTS

JP 11-121281 A 4/1999

* cited by examiner

*Primary Examiner* — Nguyen T Ha
(74) *Attorney, Agent, or Firm* — McDermott Will & Emery LLP

(57) ABSTRACT

A solid electrolytic capacitor includes an anode body, a dielectric coating formed to cover the anode body, a first solid electrolyte layer formed to cover the dielectric coating, a second solid electrolyte layer made of a conductive polymer and formed to cover a relatively thin portion of the first solid electrolyte layer, and a cathode layer formed to cover the first solid electrolyte layer and the second solid electrolyte layer.

11 Claims, 8 Drawing Sheets

SOLID ELECTROLYTIC CAPACITOR AND METHOD FOR MANUFACTURING THE SAME

This nonprovisional application is based on Japanese Patent Application No. 2012-191235 filed on Aug. 31, 2012 with the Japan Patent Office, the entire contents of which are hereby incorporated by reference.

BACKGROUND OF THE INVENTION

1. Field of the Invention

The present invention relates to a solid electrolytic capacitor and a method for manufacturing, the same.

2. Description of the Related Art

A solid electrolytic capacitor has been conventionally known as a capacitor suitable for size reduction, and a solid electrolytic capacitor having a solid electrolyte layer made of a conductive polymer has been widely used.

Japanese Patent Laying-Open No. 11-121281, for example, discloses a method for manufacturing a solid electrolytic capacitor that has high thermal stability and excellent reliability when mounted. According to the method for manufacturing a solid electrolytic capacitor disclosed in Japanese Patent Laying-Open No. 11-121281, a capacitor element including an anode, a dielectric oxide coating and a first conductive polymer compound layer is soaked in a conductive polymer compound suspended aqueous solution, and thereby, a second conductive polymer compound layer is formed on the first conductive polymer compound layer. Japanese Patent Laying-Open No. 11-121281 discloses that since an outer surface of the second conductive polymer compound layer thus formed has many protrusions and depressions, fit between the second conductive polymer compound layer and a graphite layer formed on this second conductive polymer compound layer is enhanced.

SUMMARY OF THE INVENTION

When the solid electrolyte layer made of a conductive polymer is formed, the thickness of the solid electrolyte layer may become thin locally. In the relatively thin portion of the solid electrolyte layer, an electrical short circuit could occur between an anode body and a cathode layer formed on the solid electrolyte layer. The electrical short circuit between the anode body and the cathode layer leads to degradation in performance of the solid electrolytic capacitor such as increase in short circuit failure rate or increase in leakage current (hereinafter referred to as "LC").

The present invention has been made in order to solve the aforementioned problem. An object of the present invention is to provide a solid electrolytic capacitor with excellent performance, and another object thereof is to provide a method for manufacturing the solid electrolytic capacitor.

A solid electrolytic capacitor according to the present invention includes: an anode body; a dielectric coating formed to cover the anode body; a first solid electrolyte layer formed to cover the dielectric coating; a second solid electrolyte layer made of a conductive polymer and formed to cover a relatively thin portion of the first solid electrolyte layer; and a cathode layer formed to cover the first solid electrolyte layer and the second solid electrolyte layer.

A first method for manufacturing a solid electrolytic capacitor according to the present invention includes the steps of: forming an anode body; forming a dielectric coating to cover the anode body; forming a first solid electrolyte layer to cover the dielectric coating; forming, a second solid electrolyte layer made of a conductive polymer, to cover a relatively thin portion of the first solid electrolyte layer; and forming a cathode layer to cover the first solid electrolyte layer and the second solid electrolyte layer.

A second method for manufacturing a solid electrolytic capacitor according to the present invention includes the steps of: forming an anode body; forming a dielectric coating to cover the anode body; forming a first solid electrolyte layer to cover the dielectric coating; removing a burr produced at the first solid electrolyte layer; forming a second solid electrolyte layer made of a conductive polymer, to cover a portion of the first solid electrolyte layer from which the burr was removed; and forming a cathode layer to cover the first solid electrolyte layer and the second solid electrolyte layer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
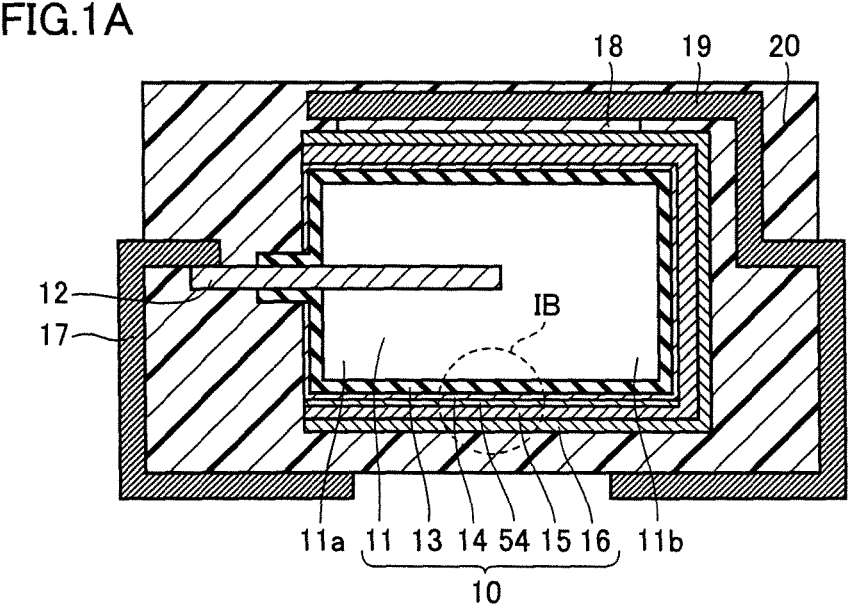
FIG. 1A is a cross-sectional view showing an example of a configuration of a solid electrolytic capacitor according to an embodiment of the present invention.

A solid electrolytic capacitor and a method for manufacturing the same according to the present invention will be described hereinafter with reference to the drawings. In the drawings of the present invention, the same or corresponding portions are denoted by the same reference characters. In addition, for clarification and simplification of the drawings, the dimensional relationship such as length, width, thickness, and depth is changed as appropriate and does not represent the actual dimensional relationship.

First Embodiment

[Configuration of Solid Electrolytic Capacitor]

Figure 1B:
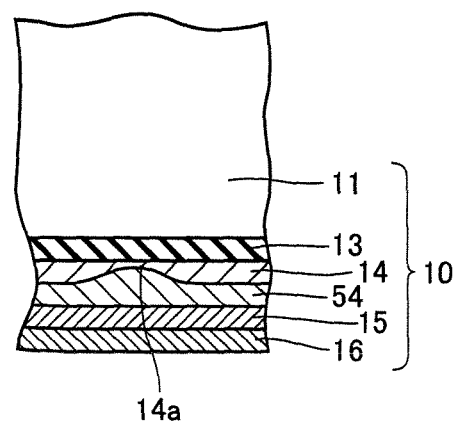
FIG. 1B is an enlarged view of an 1B region shown in FIG. 1A.

FIG. 1A is a cross-sectional view showing a configuration of a solid electrolytic capacitor according to a first embodiment of the present invention, and FIG. 1B is an enlarged view of an IB region shown in FIG. 1A. The solid electrolytic capacitor according to the present embodiment includes an anode body 11 having a first end 11a and a second end 11b opposite to each other, an anode lead 12 erected on first end 11a of anode body 11, a dielectric coating 13 formed to cover anode body 11, and a first solid electrolyte layer 14 formed to cover dielectric coating 13. First solid electrolyte layer 14 has a relatively thin portion (hereinafter may be referred to as "thinned portion") 14a of first solid electrolyte layer 14 at an outer circumferential portion of in anode body 11, and a second solid electrolyte layer 54 made of a conductive polymer is formed to cover thinned portion 14a. A cathode layer obtained by sequentially stacking a carbon layer 15 and a silver paint layer 16 is formed to cover first solid electrolyte layer 14 and second solid electrolyte layer 54. Anode body 11, dielectric coating 13, first solid electrolyte layer 14, second solid electrolyte layer 54, carbon layer 15, and silver paint layer 16 form a capacitor element 10.

An anode terminal 17 is connected to anode lead 12. A cathode terminal 19 is connected to silver paint layer 16 with a bonding layer 18 of a conductive adhesive being interposed therebetween. Capacitor element 10 is sealed by an exterior resin 20 such that a part of anode terminal 17 and a part of cathode terminal 19 are exposed. The portions of anode terminal 17 and cathode terminal 19 exposed from exterior resin 20 are folded along a surface of exterior resin 20.

A material of anode body 11 is not particularly limited and may only have conductivity. A valve-acting metal such as tantalum, niobium, titanium, and aluminum can, for example, be suitably used as the material of anode body 11. In addition, anode body 11 is preferably a porous sintered compact. A material of anode lead 12 is not particularly limited as long as it is a metal, and a valve-acting metal can be suitably used.

A material of dielectric coating 13 is not particularly limited and may only have dielectric property. Metal oxide formed by chemical conversion treatment of anode body 11 made of the valve-acting metal is suitable, for example, as the material of dielectric coating 13. For example, when chemical conversion treatment is performed on tantalum (Ta) serving as the material of anode body 11, dielectric coating 13 is formed of $Ta_2O_5$. When chemical conversion treatment is performed on aluminum (Al) serving, as the material of anode body 11, dielectric coating 13 is formed of $Al_2O_3$.

First solid electrolyte layer 14 is preferably formed of a conductive polymer including at least one of an aliphatic compound, an aromatic compound, a heterocyclic compound, and a heteroatom-containing compound. For example, first solid electrolyte layer 14 is preferably formed of at least one of polythiophene and derivatives thereof, polypyrrole and derivatives thereof, polyaniline and derivatives thereof, and polyfuran and derivatives thereof. Among these, first solid electrolyte layer 14 preferably includes at least one of polypyrrole and derivatives thereof.

Although first solid electrolyte layer 14 may be formed by a chemical polymerization method, first solid electrolyte layer 14 is preferably thrilled by an electrolytic polymerization method. Whichever method is used to form first solid electrolyte layer 14, thinned portion 14a may be formed in some cases.

Conventionally, if the thinned portion is formed at the solid electrolyte layer, the carbon layer and the silver paint layer enter a neighborhood of the anode body in the thinned portion. Therefore, in the thinned portion, an electrical short circuit could occur between the anode body and the carbon layer or the silver paint layer, which leads to degradation in performance of the solid electrolytic capacitor such as increase in short circuit failure rate or increase in LC.

In the present embodiment, however, second solid electrolyte layer 54 made of the conductive polymer is formed to cover thinned portion 14a. As a result, entry of carbon layer 15 and silver paint layer 16 into the neighborhood of anode body 11 in thinned portion 14a can be prevented. On top of that, the sum of the thickness of first solid electrolyte layer 14 and the thickness of second solid electrolyte layer 54 in thinned portion 14a (hereinafter may be referred to as "thickness of the layer made of the conductive polymer in thinned portion 14a") can be ensured, and thus, the self-repairing function of the conductive polymer material can be implemented in thinned portion 14a as well. Specifically, even when a minute defect portion is present in a portion of dielectric coating 13 that is in contact with thinned portion 14a, Joule heat is generated by a current flowing through the minute defect portion, and the conductive polymer material formed on the minute defect portion becomes insulated, so that the leakage current can be reduced. Based on the above, in the solid electrolytic capacitor according to the present embodiment, an electrical short circuit between anode body 11 and carbon layer 15 or silver paint layer 16 in thinned portion 14a can be prevented, and thus, the short circuit failure rate decreases and the LC decreases. Therefore, there can be provided a solid electrolytic capacitor with excellent performance. Second solid electrolyte layer 54 will be described below.

Similarly to first solid electrolyte layer 14, second solid electrolyte layer 54 is preferably formed of a conductive polymer including at least one of an aliphatic compound, an aromatic compound, a heterocyclic compound, and a heteroatom-containing compound. For example, second solid electrolyte layer 54 is preferably formed of at least one of polythiophene and derivatives thereof, polypyrrole and derivatives thereof, polyaniline and derivatives thereof, and polyfuran and derivatives thereof. Second solid electrolyte layer 54 more preferably includes at least one of polyaniline and derivatives thereof, and polythiophene and derivatives thereof, and is further preferably formed of polythiophene or derivatives thereof. PEDOT (Poly(3,4-ethylenedioxythiophene)) can, for example, be used as the derivatives of polythiophene.

Second solid electrolyte layer 54 may, for example, be formed by causing a dispersion that has particles or aggregates of a conductive polymer such as polythiophene dispersed therein to adhere to thinned portion 14a, or may be formed by causing a solution that has a conductive polymer such as polyaniline dissolved therein to adhere to thinned portion 14a. Second solid electrolyte layer 54 is preferably formed such that the sum of the thickness of first solid electrolyte layer 14 and the thickness of second solid electrolyte layer 54 (hereinafter may be referred to as "total thickness of the solid electrolyte layer") is 1 μm or more and 100 μm or less.

Carbon layer 15 may only have conductivity, and graphite can be used, for example. Silver paint layer 16 can be formed of silver particles. Anode terminal 17 and cathode terminal 19 may only have conductivity, and a metal such as copper can be used, for example. Bonding layer 18 may only have conductivity and adhesiveness, and a silver adhesive containing silver as a filler can be used, for example. A material of exterior resin 20 is not particularly limited, and a known resin such as an epoxy resin can be used, for example.

[Method for Manufacturing Solid Electrolytic Capacitor]

Figure 2:
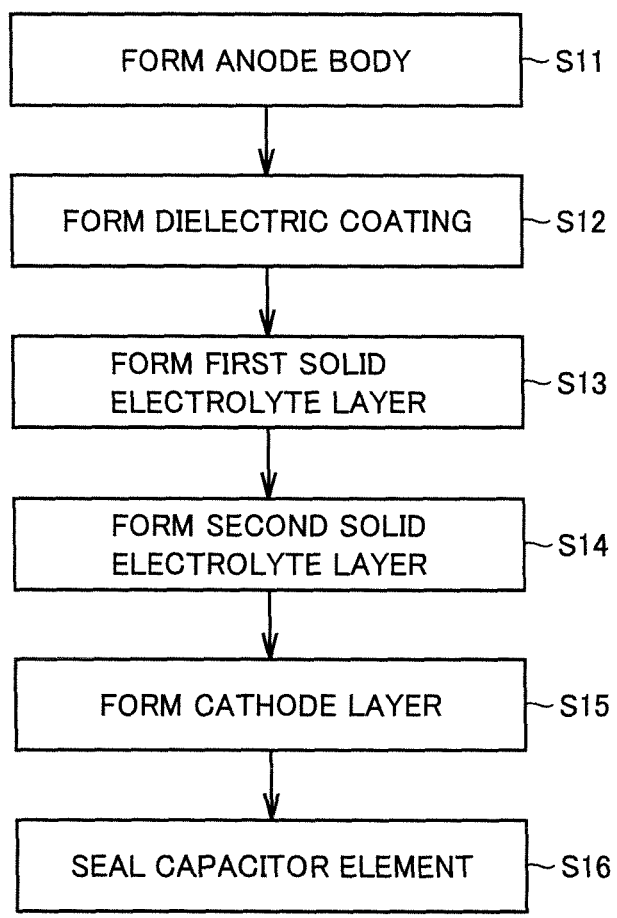
FIG. 2 is a flowchart showing an example of a method for manufacturing the solid electrolytic capacitor according to the embodiment of the present invention.

FIG. 2 is a flowchart showing a method for manufacturing the solid electrolytic capacitor according to the present embodiment. FIGS. 3A to 3C and FIGS. 4A to 4B are cross-sectional views showing, in the order of steps, the method for manufacturing the solid electrolytic capacitor according to the present embodiment.

(Formation of Anode Body)

Figure 3A:
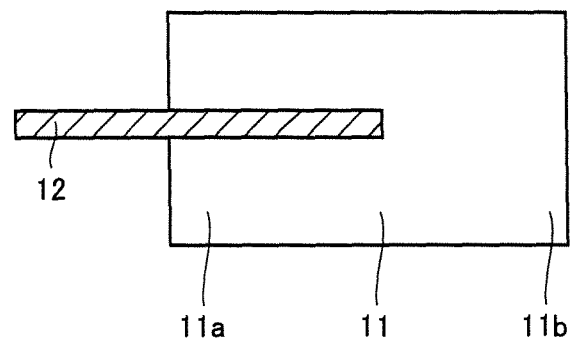
FIGS. 3A to 3C are cross-sectional views showing, in the order of steps, the example of the method for manufacturing the solid electrolytic capacitor according to the embodiment of the present invention.

First, in step S11 in FIG. 2, anode body 11 is formed as shown in FIG. 3A. For example, metal powder is prepared, and this powder is molded into a desired shape, with one end side of rod-like anode lead 12 in the longitudinal direction buried into the metal powder. Next, the molded body is sintered to form porous anode body 11 into which the one end of anode lead 12 is buried.

The material of anode body 11 is not particularly limited. From the viewpoint of easy formation of dielectric coating 13, however, the valve-acting metal such as tantalum, niobium, titanium, and aluminum is preferably used. The material of anode lead 12 is not particularly limited, either. From the viewpoint similar to that of anode body 11, however, the valve-acting metal is preferably used.

(Formation of Dielectric Coating)

Figure 3B:
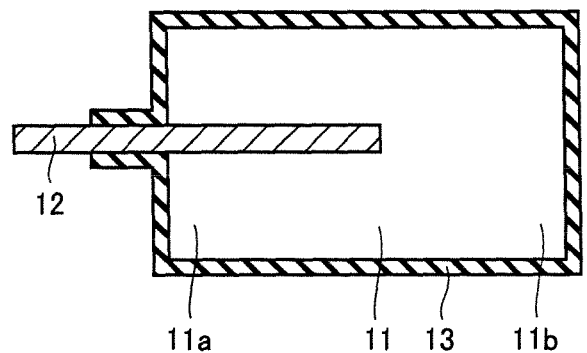

Next, in step S12 in FIG. 2, dielectric coating 13 is formed to cover anode body 11 as shown in FIG. 3B. A method for forming dielectric coating 13 is not particularly limited. For example, when anode body 11 is made of the valve-acting metal, dielectric coating 13 can be formed on a surface of anode body 11 by chemical conversion treatment of anode body 11. As the chemical conversion treatment, for example, anode body 11 may be soaked in a chemical conversion solution such as a phosphoric acid aqueous solution or nitric acid aqueous solution and be thermally treated, or anode body 11 may be soaked in a chemical conversion solution and a voltage may be applied. As a result, the surface of anode body 11 can be changed into dielectric coating 13.

(Formation of First Solid Electrolyte Layer)

Figure 3C:
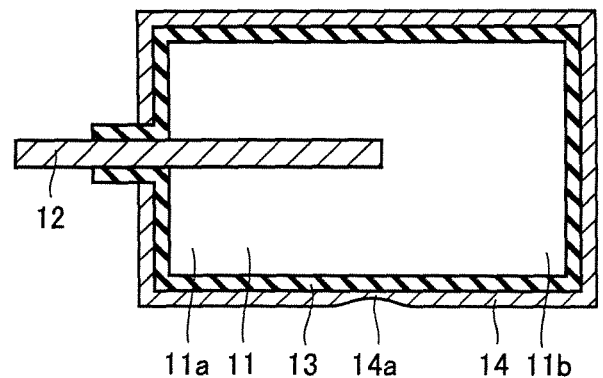

Next, in step S13 in FIG. 2, first solid electrolyte layer 14 is formed to cover dielectric coating 13 as shown in FIG. 3C. Although first solid electrolyte layer 14 may be formed by the chemical polymerization method, first solid electrolyte layer 14 is preferably formed by the electrolytic polymerization method. In the present embodiment, a method for forming first solid electrolyte layer 14 by the chemical polymerization method will be described first, and then, a method for forming first solid electrolyte layer 14 by the electrolytic polymerization method will be described.

A liquid-phase polymerization method, a vapor-phase polymerization method or the like by which a precursor monomer of the polymer forming first solid electrolyte layer 14 is oxidatively polymerized by using an oxidant can be used as the chemical polymerization method. The thickness of first solid electrolyte layer 14 may be increased by repeated chemical polymerization.

A compound that forms, by polymerization, a conductive polymer such as polythiophene or derivatives thereof, polypyrrole or derivatives thereof, polyaniline or derivatives thereof, or polyfuran or derivatives thereof can be used as the precursor monomer. 3,4-ethylenedioxythiophene, N-methylpyrrole or the like can for example, be used as the precursor monomer.

Any oxidant may be used as long as it can polymerize the precursor monomer. At least one of sulfuric acid, hydrogen peroxide and the like can, for example, be used as the oxidant.

First solid electrolyte layer 14 may include a dopant. The dopant can include, for example, acid or salt of a sulfonic acid compound such as alkyl sulfonic acid, aromatic sulfonic acid and polycyclic aromatic sulfonic add. An aromatic sulfonic acid metal salt and the like having the function of the oxidant and the function of the dopant can also be used.

As the method for forming first solid electrolyte layer 14 by the electrolytic polymerization method, there is, for example, a method for funning first solid electrolyte layer 14 to cover dielectric coating 13, by forming a precoat layer on the surface of anode body 11 having dielectric coating 13 formed thereon, and then, soaking the precoat layer in a polymerization liquid containing the precursor monomer and the dopant of first solid electrolyte layer 14 and passing a current through the precoat layer. A conductive polymer layer formed by the aforementioned chemical polymerization method can, for example, be used as the precoat layer. In the case as well of forming first solid electrolyte layer 14 by the electrolytic polymerization method, the precursor monomer and the dopant that can be used in the case of forming first solid electrolyte layer 14 by the chemical polymerization method can be used without particular limitation. In addition, known polymerization conditions in the case of forming the solid electrolyte layer of the solid electrolytic capacitor by the electrolytic polymerization method can be applied without particular limitation as polymerization conditions under the electrolytic polymerization method.

When first solid electrolyte layer 14 is formed by the electrolytic polymerization method, a burr may be formed in some cases. If the formed burr has such a size that removal thereof is unnecessary, the process proceeds to the next step without removing the burr. However, thinned portion 14a may be formed around the burr in some cases. Thinned portion 14a may also be formed when first solid electrolyte layer 14 is formed by the chemical polymerization method. If the cathode layer is formed on first solid electrolyte layer 14 having thinned portion 14a, an electrical short circuit could occur between the anode body and the cathode layer in thinned portion 14a, which leads to degradation in performance of the solid electrolytic capacitor such as increase in short circuit failure rate or increase in LC. Thus, second solid electrolyte layer 54 is formed after the step of forming first solid electrolyte layer 14 and before the step of forming the cathode layer.

When first solid electrolyte layer 14 is formed by the electrolytic polymerization method, the burr may be formed in some cases. On the other hand, when first solid electrolyte layer 14 is formed by the chemical polymerization method, formation of the burr is not likely. Thus, the effect obtained by forming second solid electrolyte layer 54 to cover thinned portion 14a is more pronounced in the case of forming the first solid electrolyte layer by electrolytic polymerization than in the case of forming the first solid electrolyte layer by chemical polymerization. Therefore, formation of first solid electrolyte layer 14 by the electrolytic polymerization method is more preferable than formation of first solid electrolyte layer 14 by the chemical polymerization method.

(Formation of Second Solid Electrolyte Layer)

Figure 4A:
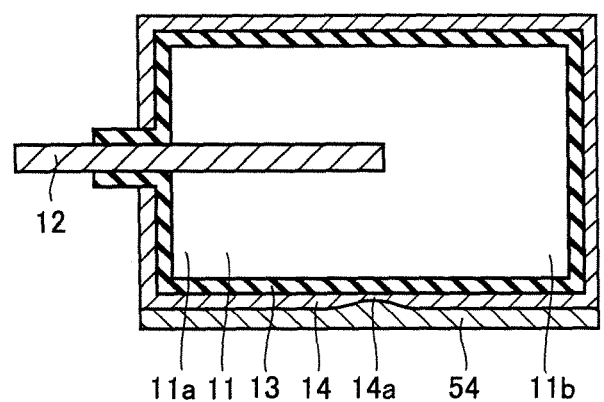
FIGS. 4A to 4B are cross-sectional views showing, in the order of steps, the example of the method for manufacturing the solid electrolytic capacitor according to the embodiment of the present invention.

Next, in step S14 in FIG. 2, second solid electrolyte layer 54 is formed to cover thinned portion 14a as shown in FIG. 4A. For example, second solid electrolyte layer 54 may be formed by causing a dispersion that has particles or aggregates of a conductive polymer dispersed therein to adhere to thinned portion 14a, or may be formed by causing a solution that has a conductive polymer dissolved therein to adhere to thinned portion 14a. As a result, entry of carbon layer 15 and silver paint layer 16 into the neighborhood of anode body 11 in thinned portion 14a can be prevented. On top of that, as described in [Configuration of Solid Electrolytic Capacitor] above, the thickness of the layer made of the conductive polymer in thinned portion 14a can be ensured, and thus, the self-repairing function of the conductive polymer material can be implemented in thinned portion 14a as well. Based on the above, in the solid electrolytic capacitor manufactured in accordance with the method for manufacturing the solid electrolytic capacitor according to the present embodiment, an electrical short circuit between anode body 11 and carbon layer 15 or silver paint layer 16 in thinned portion 14a can be prevented, and thus, the short circuit failure rate decreases and the LC decreases. Therefore, with the method for manufacturing the solid electrolytic capacitor according to the present embodiment, a solid electrolytic capacitor with excellent performance can be manufactured.

Since first solid electrolyte layer 14 must be formed inside pores as well of the porous structure forming anode body 11, first solid electrolyte, layer 14 is preferably formed by the chemical polymerization method or the electrolytic polymerization method. However, second solid electrolyte layer 54 coats thinned portion 14a. From the viewpoint of effective coating of thinned portion 14a, it is more preferable to form second solid electrolyte layer 54 by causing the aforementioned dispersion or the aforementioned solution to adhere to thinned portion 14a than to form second solid electrolyte layer 54 by the chemical polymerization method and the electrolytic polymerization method. As a result, the effect of preventing an electrical short circuit in thinned portion 14a can be effectively obtained.

Furthermore, in the method for manufacturing the solid electrolytic capacitor according to the present embodiment, second solid electrolyte layer 54 is formed only in a location that requires second solid electrolyte layer 54, and thus, the cost can be reduced as compared with the case of forming the second solid electrolyte layer to cover the entire first solid electrolyte layer (a third embodiment described below).

A method for forming second solid electrolyte layer 54 by causing the dispersion to adhere to thinned portion 141a includes, for example, a method for causing the dispersion to adhere to thinned portion 14a by a known method such as soaking or application. It is preferable to cause the dispersion to adhere to thinned portion 14a such, that the total thickness of the solid electrolyte layer becomes 1 μm or more and 100 μm or less. Thereafter, a solvent contained in the dispersion may be removed by drying. As a drying method, for example, drying is preferably carried out for 30 seconds or more and 1 hour or less at a temperature that is equal to or higher than the boiling point of the solvent contained in the dispersion, or drying is more preferably carried out for 10 minutes or more and 30 minutes or less at a temperature that is equal to or higher than the aforementioned boiling point and is equal to or lower than a temperature higher by 50° C. than this boiling point. The same is applied as well to the case of forming second solid electrolyte layer 54 by causing the solution that has a conductive polymer dissolved therein to adhere to thinned portion 14a.

The dispersion preferably contains the particles or aggregates of the conductive polymer, and the solvent, for example. As described above, at least one of art aliphatic compound, an aromatic compound, a heterocyclic compound, and a heteroatom-containing compound can be used, and at least one of polythiophene and derivatives thereof, polypyrrole and derivatives thereof, polyaniline and derivatives thereof, and polyfuran and derivatives thereof can, for example, be used as the conductive polymer forming second solid electrolyte layer 54. Among these, the conductive polymer forming the particles or aggregates contained in the dispersion includes PEDOT preferably.

Any solvent is used without particular limitation as the solvent contained in the dispersion, as long as it is a material that allows particles or aggregates of a conductive polymer to be dispersed therein. Water, alcohol, aliphatic ketone, aliphatic hydrocarbon, aromatic hydrocarbon or the like can, for example, be used as the solvent contained in the dispersion.

In the case of forming second solid electrolyte layer 54 by causing the solution that has a conductive polymer dissolved therein to adhere to thinned portion 14a, the solution that has a conductive polymer dissolved therein preferably contains the conductive polymer and a solvent that can dissolve the conductive polymer. As described above, at least one of an aliphatic compound, an aromatic compound, a heterocyclic compound, and a heteroatom-containing compound can be used, and in consideration of solubility in the solvent, polyaniline or derivatives thereof is preferably used as the conductive polymer forming second solid electrolyte layer 54. Any solvent is used without particular limitation as the solvent that can dissolve the conductive polymer, as long as it is a material that can dissolve the conductive polymer.

(Formation of Cathode Layer)

Figure 4B:
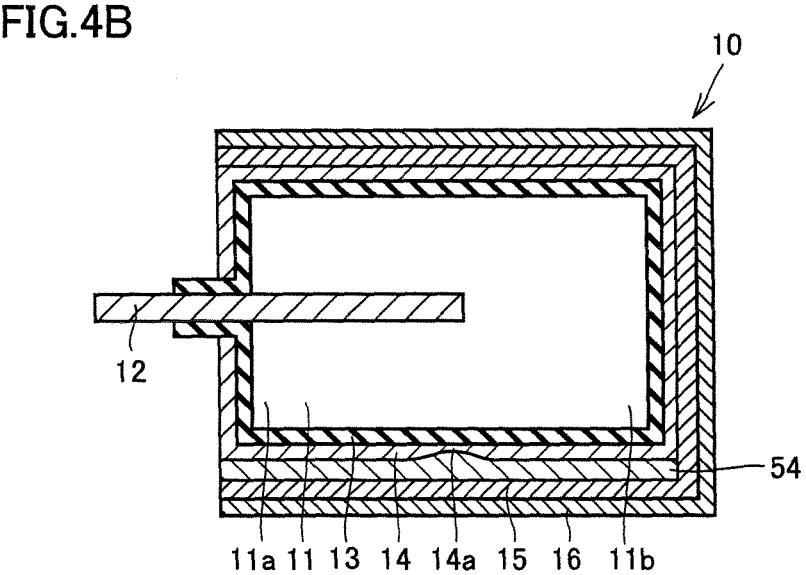

Next, in step S15 in FIG. 2, carbon layer 15 and silver paint layer 16 are formed to cover first solid electrolyte layer 14 and second solid electrolyte layer 54 as shown in FIG. 4B.

A method for forming each of carbon layer 15 and silver paint layer 16 is not particularly limited. Carbon layer 15 can be formed, for example, by soaking anode body 11 having first solid electrolyte layer 14 and second solid electrolyte layer 54 formed thereon in a solution having carbon particles dispersed therein, and thereafter, carrying out drying. Silver paint layer 16 can be formed, for example, by forming carbon layer 15, and thereafter, soaking anode body 11 in a solution containing silver particles and carrying out drying. Capacitor element 10 is manufactured in accordance with the aforementioned steps.

(Sealing of Capacitor Element)

Next, in step S16 in FIG. 2, capacitor element 10 is sealed as shown in FIG. 1A to manufacture the solid electrolytic capacitor. A sealing method is not particularly limited and includes the following method, for example.

Specifically, first, one end of anode terminal 17 is connected to one end of anode lead 12 exposed from anode body 11. In addition, bonding layer 18 is formed on silver paint layer 16 and one end of cathode terminal 19 is connected to silver paint layer 16 by this bonding layer 18. Next, capacitor element 10 is sealed by exterior resin 20 such that the other ends of anode terminal 17 and cathode terminal 19 are exposed. Finally, exposed anode terminal 17 and cathode terminal 19 are folded along exterior resin 20 and aging is carried out. The solid electrolytic capacitor shown in FIG. 1A is thus manufactured.

A position where thinned portion 14a is formed is not limited to the position shown in FIG. 1A. A plurality of thinned portions 14a may be formed at first solid electrolyte layer 14. In each case, an electrical short circuit between anode body 11 and the cathode layer in thinned portion 14a can be prevented if second solid electrolyte layer 54 is formed to cover thinned portion 14a. Therefore, the short circuit failure rate decreases and the LC decreases. As a result, there can be provided a solid electrolytic, capacitor with excellent performance.

Second Embodiment

A second embodiment of the present invention describes a solid electrolytic capacitor and a method for manufacturing the same, in which, when a thinned portion is formed due to removal of a burr produced when forming a first solid electrolyte layer by the electrolytic polymerization method, an electrical short circuit between an anode body and a cathode layer in the thinned portion is prevented. Differences from the aforementioned first embodiment will be mainly described below.

[Configuration of Solid Electrolytic Capacitor]

Figure 5A:
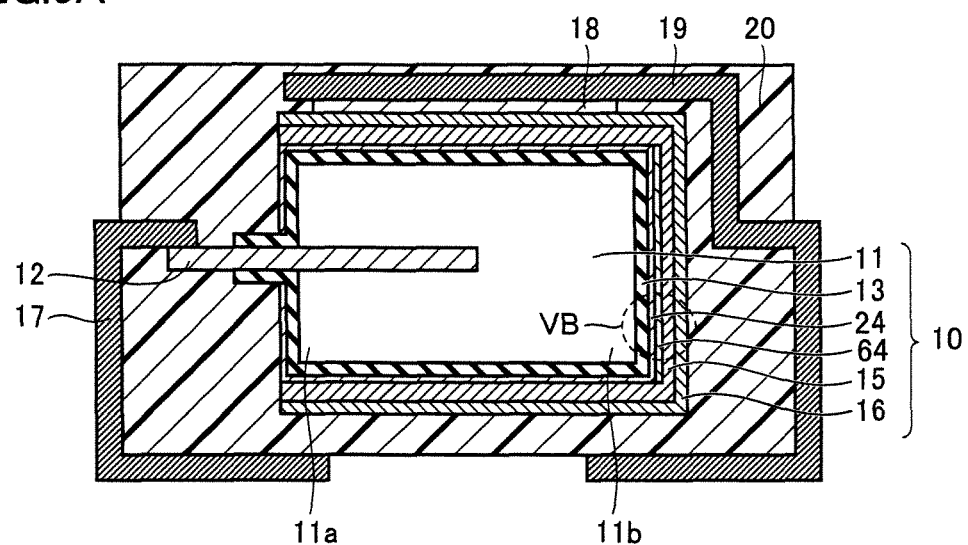
FIG. 5A is a cross-sectional view showing an example of a configuration of a solid electrolytic capacitor according to another embodiment of the present invention.
Figure 5B:
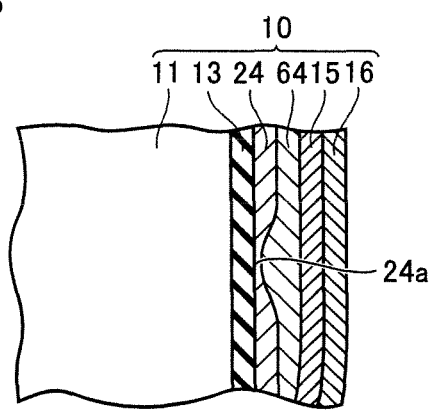
FIG. 5B is an enlarged view of a VB region shown in FIG. 5A.

FIG. 5A is a cross-sectional view showing a configuration of a solid electrolytic capacitor according to the present embodiment, and FIG. 5B is an enlarged view of a VB region shown in FIG. 5A. In the present embodiment, a first solid electrolyte layer 24 is formed by the electrolytic polymerization method. When first solid electrolyte layer 24 is formed by the electrolytic polymerization method, a burr 94 (refer to FIG. 7A) may be formed at first solid electrolyte layer 24 in some cases. If the solid electrolytic capacitor is manufactured under the presence of burr 94, burr 94 could come into contact with cathode terminal 19, and burr 94 could be exposed from exterior resin 20. Therefore, burr 94 is preferably removed. When burr 94 is removed, first solid electrolyte layer 24 and the like located directly under burr 94 may be removed together with burr 94. A thinned portion 24a is thus formed, in other words, in the present embodiment, thinned portion 24a corresponds to a portion of first solid electrolyte layer 24 from which burr 94 was removed. Depending on the arrangement relationship between anode body 11 and an electrode used in electrolytic polymerization, burr 94 is often produced at first solid electrolyte layer 24 formed on the second end 11b side of anode body 11. Therefore, thinned portion 24a is often produced at first solid electrolyte layer 24 formed on the second end 11b side of anode body 11.

A second solid electrolyte layer 64 is formed to cover thinned portion 24a. As a result, in the present embodiment as well, an electrical short circuit between anode body 11 and carbon layer 15 or silver paint layer 16 in thinned portion 24a can be prevented. Thus, the short circuit failure rate decreases and the LC decreases. Therefore, there can be provided a solid electrolytic capacitor with excellent performance. Since thinned portion 24a is formed on the second end 11b side of anode body 11, second solid electrolyte layer 64 is formed to cover first solid electrolyte layer 24 formed on the second end 11b side of anode body 11.

[Method for Manufacturing Solid Electrolytic Capacitor]

Figure 6:
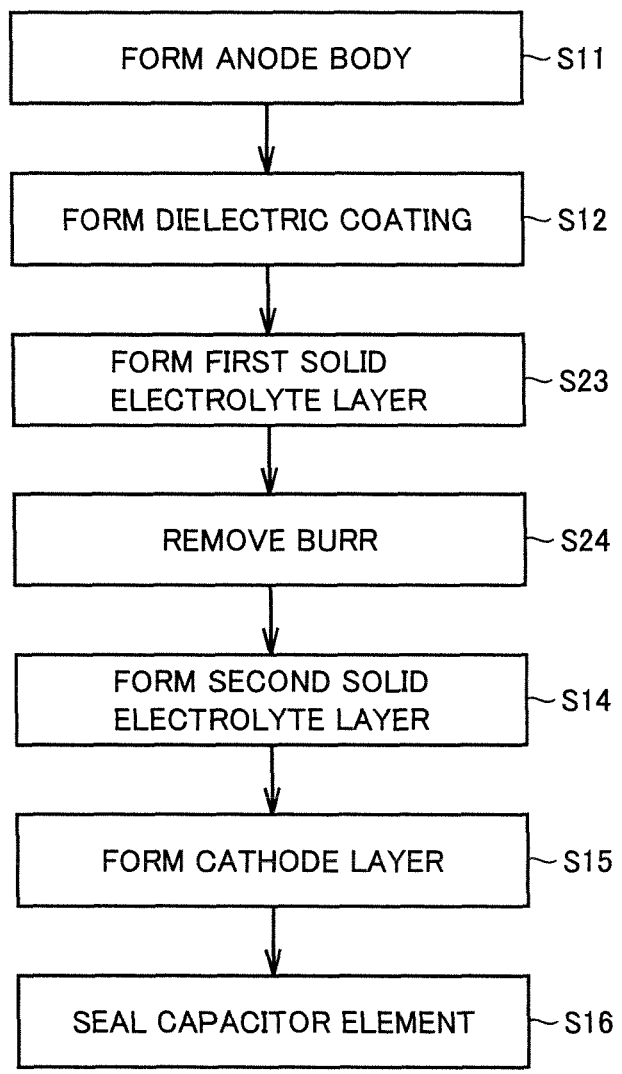
FIG. 6 is a flowchart showing an example of a method for manufacturing the solid electrolytic capacitor according to another embodiment of the present invention.
Figure 7A:
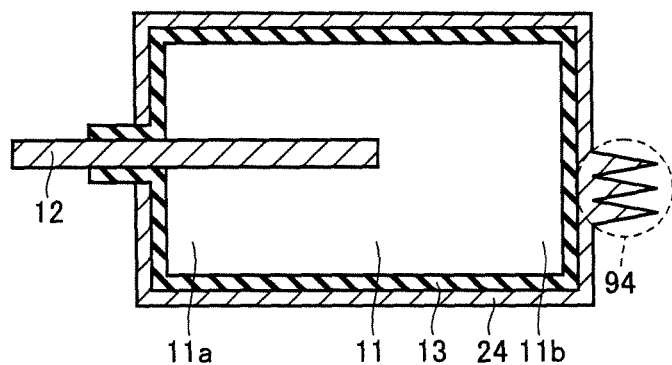
FIGS. 7A to 7C are cross-sectional views showing, in the order of steps, the example of the method for manufacturing the solid electrolytic capacitor according to another embodiment of the present invention.
Figure 7B:
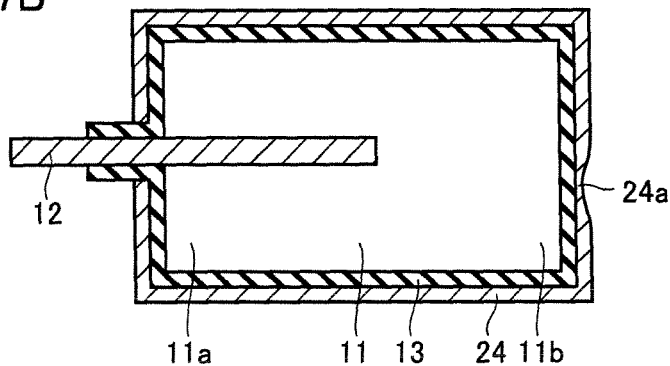
Figure 7C:
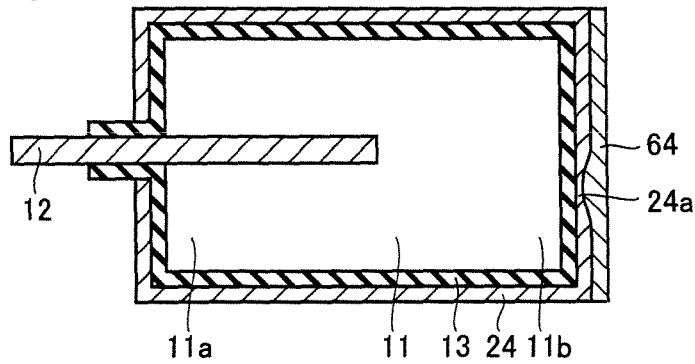

FIG. 6 is a flowchart showing a method for manufacturing the solid electrolytic capacitor according to the present embodiment. FIGS. 7A to 7C are cross-sectional views showing, in the order of steps, the method for manufacturing the solid electrolytic capacitor according to the present embodiment.

First, anode body 11 is formed in step S11 in FIG. 6, and then, dielectric coating 13 is formed in step S12 in FIG. 6. The step of forming anode body 11 and the step of forming dielectric coating 13 are as described in the aforementioned first embodiment.

(Formation of First Solid Electrolyte Layer)

Next, in step S23 in FIG. 6, first solid electrolyte layer 24 is formed to cover dielectric coating 13 as shown in FIG. 7A. First solid electrolyte layer 24 can be formed in accordance with the method for forming first solid electrolyte layer 14 by the electrolytic polymerization method in the aforementioned first embodiment.

In the present embodiment, first solid electrolyte layer 24 is formed by the electrolytic polymerization method, and thus, burr 94 is formed on the second end 11b side of anode body 11 as shown in FIG. 7A. There are various possible causes of formation of burr 94. For example, one of the causes is that a part of a conductive polymer grows from anode body 11 toward the electrode (electrode used in electrolytic polymerization) during electrolytic polymerization. Burr 94 may be exposed from exterior resin 20 in some cases, which leads to reduction in manufacturing yield of the solid electrolytic capacitor. Therefore, burr 94 is removed.

(Removal of Burr)

Next, in step S24 in FIG. 6, burr 94 is removed as shown in FIG. 7B. A mechanical removal method such as cutting, polishing or blasting, or a chemical removal method such as chemical polishing or electrolytic polishing can be used as a method for removing burr 94.

When burr 94 is removed, first solid electrolyte layer 24 located directly under burr 94 is removed together with burr 94. Therefore, as shown in FIG. 7B, a portion of first solid electrolyte layer 24 from which burr 94 was removed becomes thinned portion 24a. Therefore, in the present embodiment, thinned portion 24a is formed on the second end 11b side of anode body 11.

(Formation of Second Solid Electrolyte Layer)

Next, in step S14 in FIG. 6, second solid electrolyte layer 64 is formed to cover thinned portion 24a as shown in FIG. 7C. A method for forming second solid electrolyte layer 64 is as described in the aforementioned first embodiment. Second solid electrolyte layer 64 may be formed by causing a dispersion that has particles or aggregates of a conductive polymer dispersed therein to adhere to thinned portion 24a, or may be formed by causing a solution that has a conductive polymer dissolved therein to adhere to thinned portion 24a. In the present embodiment, thinned portion 24a is formed on the second end 11b side of anode body 11, and thus, second solid electrolyte layer 64 is formed on the second end 11b side of anode body 11.

Next, the cathode layer is thrilled in step S15 in FIG. 6, and then, capacitor element 10 is sealed in step S16 in FIG. 6. The step of forming the cathode layer and the step of sealing capacitor element 10 are as described in the aforementioned first embodiment. The solid electrolytic capacitor shown in FIG. 5A is thus manufactured.

Third Embodiment

In the third embodiment of the present invention, a second solid electrolyte layer is formed to cover the entire first solid electrolyte layer in the aforementioned second embodiment. Differences from the aforementioned second embodiment will be mainly described below.

[Configuration of Solid Electrolytic Capacitor]

Figure 8:
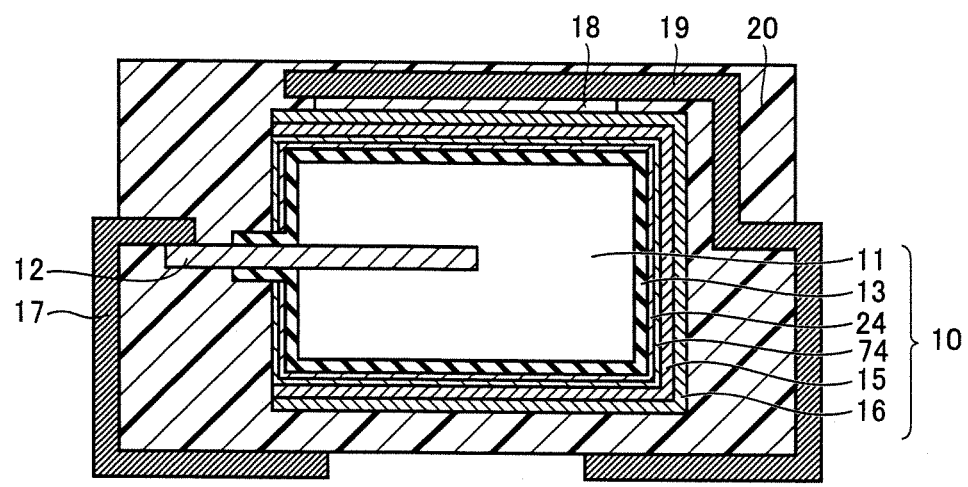
FIG. 8 is a cross-sectional view showing an example of a configuration of a solid electrolytic capacitor according to still another embodiment of the present invention.

FIG. 8 is a cross-sectional view showing a configuration of a solid electrolytic capacitor according to the present embodiment. In the present embodiment, a second solid electrolyte layer 74 is formed to cover the whole of first solid electrolyte layer 24.

[Method for Manufacturing Solid Electrolytic Capacitor]

First, the step of forming anode body 11 and the step of forming dielectric coating 13 are performed sequentially in accordance with the method described in the aforementioned first embodiment. Next, first solid electrolyte layer 24 is formed.

In the step of forming first solid electrolyte layer 24, first solid electrolyte layer 24 is formed by the electrolytic polymerization method in accordance with the method described in the aforementioned second embodiment. When first solid electrolyte layer 24 is formed by the electrolytic polymerization method, burr 94 (refer to FIG. 7A) is formed at first solid electrolyte layer 24. Therefore, burr 94 is removed in accordance with the method described in the aforementioned second embodiment.

When burr 94 (refer to FIG. 7A) is removed, first solid electrolyte layer 24 and the like located directly under burr 94 are removed together with burr 94, and thus, thinned portion 24a (refer to FIG. 7B) is formed. Thereafter, the step of forming second solid electrolyte layer 74 is performed.

In the step of forming second solid electrolyte layer 74, second solid electrolyte layer 74 is formed to cover not only thinned portion 24a but also the whole of first solid electrolyte layer 24. For example, anode body 11 having first solid electrolyte layer 24 formed thereon may be soaked in a dispersion that has particles or aggregates of a conductive polymer dispersed therein, or may be soaked in a solution that has a conductive polymer dissolved therein. When second solid electrolyte layer 74 is formed to cover the whole of first solid electrolyte layer 24 as described above, second solid electrolyte layer 74 covers thinned portion 24a inevitably. Therefore, the short circuit failure rate further decreases and the EC further decreases as compared with the aforementioned first and second embodiments. In addition, the total thickness of the solid electrolyte layer can be ensured. Therefore, the equivalent series resistance (hereinafter referred to as "ESR") decreases as compared with the aforementioned first and second embodiments. Furthermore, since second solid electrolyte layer 74 can be formed without checking the location where thinned portion 24a was formed, second solid electrolyte layer 74 can be easily formed in a short time. This effect is pronounced when thinned portion 24a is formed over a plurality of locations. The soaking time is not particularly limited and is preferably adjusted such that the total thickness of the solid electrolyte layer becomes 1 µm or more and 100 µm or less.

Thereafter, the step of forming the cathode layer and the step of sealing capacitor element 10 are performed sequentially in accordance with the method described in the aforementioned first embodiment. The solid electrolytic capacitor shown in FIG. 8 is thus manufactured.

In the aforementioned first embodiment, the second solid electrolyte layer may be formed to cover the whole of first solid electrolyte layer 14. In this case as well, the effect produced in the present embodiment is obtained.

The manufacturing cost of the solid electrolytic capacitor can be made lower in the aforementioned first and second embodiments than in the aforementioned third embodiment. On the other hand, as for the performance of the solid electrolytic capacitor, the aforementioned third embodiment is the highest, followed by the aforementioned second embodiment and the aforementioned first embodiment. Based on the manufacturing cost and the required performance, it may be determined which of the solid electrolytic capacitors according to the aforementioned first to third embodiments is used.

The solid electrolytic capacitor according to the present invention has been described above in the first to third embodiments. The solid electrolytic capacitor according to the present invention is not, however, limited to the solid electrolytic capacitors according to the aforementioned first to third embodiments, and can be applied to a known shape. The known shape can include, for example, a wound-type solid electrolytic capacitor, a stacked-type solid electrolytic capacitor using a foil made of a valve-acting metal, or the like.

EXAMPLE

The present invention will be described in more detail hereinafter with reference to Examples, although the present invention is not limited thereto.

Example 1

(Formation of Anode Body)

First, tantalum powder was prepared and the tantalum powder was molded into a rectangular parallelepiped, with one end side of a rod-like anode lead of tantalum in the longitudinal direction buried, into the tantalum powder. Then, the molded body was sintered to form a porous anode body into which the one end of the anode lead was buried. At this time, the anode body had a dimension of 4.5 mm in length×3.5 mm in width×2.5 mm in height.

(Formation of Dielectric Coating)

Next, the anode body was soaked in a phosphoric acid solution and a voltage of 30 V was applied to the anode body via the anode lead. A dielectric coating formed of $Ta_2O_5$ was thus formed to cover the anode body.

(Formation of Precoat Layer)

Next, a conductive precoat layer was formed by the chemical polymerization method. Specifically, first, an ethanol solution containing pyrrole at a concentration of 0.03 mol/l as well as an aqueous solution containing ammonium persulfate and p-toluenesulfonic acid were prepared as polymerization liquids. Then, the anode body having the dielectric coating formed thereon was sequentially soaked in the aforementioned ethanol solution and the aforementioned aqueous solution, and the anode body pulled out from the aforementioned aqueous solution was left at a room temperature. The precoat layer made of polypyrrole was thus formed to cover the dielectric coating.

(Formation of First Solid Electrolyte Layer)

Next, a first solid electrolyte layer was formed by the electrolytic polymerization method. Specifically, first, an aqueous solution containing pyrrole and alkyl naphthalene sulfonic acid at a concentration of 0.03 mol/l, respectively, was prepared as an electrolytic polymerization liquid. An electrolyzer of an electrolytic polymerization device was filled with this aqueous solution, and thereafter, the anode body having the precoat layer and the like formed thereon was soaked in this aqueous solution. Then, a current of 0.5 mA was passed through the precoat layer for 3 hours. The first solid electrolyte layer made of polypyrrole was thus formed to cover the precoat layer. At this time, a thinned portion was formed at the first solid electrolyte layer formed on a lower surface of the anode body (the second end side of the anode body).

(Formation of Second Solid Electrolyte Layer)

Next, a second solid electrolyte layer was formed by using a dispersion of PEDOT. Specifically, an aqueous solution containing particles of PEDOT at a concentration of 5 wt % was prepared as the dispersion. Next, the anode body having the first solid electrolyte layer and the like formed thereon was soaked in this dispersion for 5 minutes, and then, was pulled out and dried at 100° C. for 30 minutes. The second solid electrolyte layer made of PEDOT was thus formed. At this time, the second solid electrolyte layer was formed to cover the entire first solid electrolyte layer including the thinned portion.

(Formation of Cathode Layer)

Next, a graphite particle suspension was applied onto the second solid electrolyte layer and dried in the atmosphere. A carbon layer was thus formed to cover the second solid electrolyte layer. Thereafter, a silver paint layer was formed on the carbon layer by using a solution containing silver particles. A capacitor element was manufactured in accordance with these operations.

(Sealing of Capacitor Element)

In the capacitor element, an anode terminal made of copper was welded to the anode lead, and a silver adhesive was applied to the silver paint layer to form a bonding layer, and one end of a cathode terminal made of copper was bonded to this bonding layer. Furthermore, the capacitor element was sealed by an exterior resin made of an epoxy resin such that a part of the anode terminal and a part of the cathode terminal were exposed. The anode terminal and the cathode terminal exposed from the exterior resin were folded along the exterior resin, and thereafter, aging was carried out. A solid electrolytic capacitor in Example 1 was thus manufactured. The manufactured solid electrolytic capacitor had a dimension of 73 mm in length×4.3 mm in width×3.8 mm in height.

Example 2

A solid electrolytic capacitor in Example 2 was manufactured in accordance with the method described in aforementioned Example 1, except that a burr produced when forming a first solid electrolyte layer was removed, and then, a second solid electrolyte layer was formed.

First, a dielectric coating, a precoat layer and the first solid electrolyte layer were formed in accordance with the method described in aforementioned Example 1. At this time, the burr was produced at the first solid, electrolyte layer formed on a lower surface of an anode body (the second end side of the anode body).

Next, the burr formed at the first solid electrolyte layer was removed by polishing. At this time, the first solid electrolyte layer around the burr was removed together with the burr, and thus, a thinned portion was formed on the lower surface of the anode body.

Next, the second solid electrolyte layer was formed in accordance with the method described in aforementioned Example 1. In other words, the second solid electrolyte layer was formed to cover the entire first solid electrolyte layer including the thinned portion. Thereafter, a cathode layer was formed and a capacitor element was sealed in accordance with the method described in aforementioned Example 1. The solid electrolytic capacitor in Example 2 was thus manufactured.

Example 3

A solid electrolytic capacitor in Example 3 was manufactured in accordance with the method described in aforementioned Example 2, except that a second solid electrolyte layer was formed to cover only a thinned portion.

First, a dielectric coating, a precoat layer and a first solid electrolyte layer were formed in accordance with the method described in aforementioned Example 1. At this time, a burr was produced at the first solid electrolyte layer formed on a lower surface of an anode body (the second end side of the anode body). Thereafter, the burr was removed in accordance with the method described in aforementioned Example 2. At this time, the first solid electrolyte layer around the burr was removed together with the burr, and thus, the thinned portion was formed on the lower surface of the anode body.

Next, the lower surface of the anode body (the second end side of the anode body) having the thinned portion formed thereon was soaked for 5 minutes in the aqueous solution containing particles of PEDOT which was prepared in aforementioned Example 1, and then, was pulled out and dried at 100° C. for 30 minutes. The second solid electrolyte layer made of PEDOT was thus formed to cover only the thinned portion.

Next, a cathode layer was formed and a capacitor element was sealed in accordance with the method described in aforementioned Example 1. The solid electrolytic capacitor in Example 3 was thus manufactured.

Example 4

A solid electrolytic capacitor in Example 4 was manufactured in accordance with the method described in aforementioned Example 2 except that a second solid electrolyte layer was formed by using a solution having polyaniline dissolved therein.

First, a dielectric coating, a precoat layer and a first solid electrolyte layer were formed in accordance with the method described in aforementioned Example 1. At this time, a burr was produced at the first solid electrolyte layer formed on a lower surface of an anode body (the second end side of the anode body). Thereafter, the burr was removed in accordance with the method described in aforementioned Example 2. At this time, the first solid electrolyte layer around the burr was removed together with the burr, and thus, a thinned portion was formed on the lower surface of the anode body.

Next, the second solid electrolyte layer was formed by using the solution having polyaniline dissolved therein. First, a solution containing polyaniline at a concentration of 1 wt % and containing dimethylsulfoxide as a solvent was prepared as the solution having polyaniline dissolved therein. Next, the anode body having the first solid electrolyte layer and the like formed thereon was soaked in this solution for minutes, and then, was pulled out and dried, at 100° C. for 30 minutes. The second solid electrolyte layer made of polyaniline was thus formed. At this time, the second solid electrolyte layer was thrilled to cover the entire first solid electrolyte layer including the portion of the first solid electrolyte layer whose thickness decreased by removal of the burr (thinned portion).

Next, a cathode layer was formed and a capacitor element was sealed in accordance with the method described in aforementioned Example 1. The solid electrolytic capacitor in Example 4 was thus manufactured.

Comparative Example 1

A solid electrolytic capacitor in Comparative Example 1 was manufactured in accordance with the method described in aforementioned Example 1, except that a second solid electrolyte layer was not formed.

Comparative Example 2

A solid electrolytic capacitor in Comparative Example 2 was manufactured in accordance with the method described in aforementioned Example 2, except that a second solid, electrolyte layer was not formed.

Comparative Example 3

A solid electrolytic capacitor in Comparative Example 3 was manufactured in accordance with the method described in aforementioned Comparative Example 1, except that a first solid electrolyte layer was formed by the chemical polymerization method. In Comparative Example 3, the first solid electrolyte layer was formed in accordance with the method for forming the precoat layer in aforementioned Example 1.

Comparative Example 4

A solid electrolytic capacitor in Comparative Example 4 was manufactured in accordance with the method described in aforementioned Comparative Example 3, except that a first solid electrolyte layer was formed and then a second solid electrolyte layer was formed. In Comparative Example 4, the second solid electrolyte layer was formed in accordance with the method for forming the second solid, electrolyte layer in aforementioned Example 1.

<Measurement of Capacitance>

20 solid electrolytic capacitors were extracted at random from the solid electrolytic capacitors in Examples 1 to 4 and Comparative Examples 1 to 4, respectively. The capacitance of each of the extracted solid electrolytic capacitors at a frequency of 120 Hz was measured by using an LCR meter for four-terminal measurement, and an average value for Examples 1 to 4 and Comparative Examples 1 to 4 was calculated. The larger the capacitance is, the more excellent the performance of the solid electrolytic capacitor is.

<Measurement of ESR>

20 solid electrolytic capacitors were extracted at random from the solid electrolytic capacitors in Examples 1 to 4 and Comparative Examples 1 to 4, respectively. The ESR (mΩ) of each of the extracted solid electrolytic capacitors at a frequency of 100 kHz was measured by using the LCR meter for four-terminal measurement, and an average value for Examples 1 to 4 and Comparative Examples 1 to 4 was calculated. The smaller the ESR is, the more excellent, the performance of the solid electrolytic capacitor is.

<Measurement of LC>

20 solid electrolytic capacitors were extracted at random from the solid electrolytic capacitors in Examples 1 to 4 and Comparative Examples 1 to 4, respectively. A resistor of 1 kΩ was connected in series to each of the extracted solid electrolytic capacitors, a voltmeter was connected in parallel to this resistor, and a value of a current flowing at the time of application of a rated voltage was measured. The lower the LC is the more excellent the performance of the solid electrolytic capacitor is.

<Efficiency Percentage for Outer Dimension>

100 solid electrolytic capacitors were extracted at random from the solid electrolytic capacitors in Examples 1 to 4 and Comparative Examples 1 to 4, respectively. The outer dimension of each of the extracted solid electrolytic capacitors was measured. A solid electrolytic capacitor whose outer dimension measured was out of specifications was regarded as a defective product, and the efficiency percentage for the outer dimension was measured by using (efficiency percentage for outer dimension)=(the number of defective products)/(100 the number of extracted solid electrolytic capacitors))×100. The higher the efficiency percentage for the outer dimension is, the more excellent the performance of the solid electrolytic capacitor is.

Table 1 shows conditions for manufacturing the solid electrolytic capacitor, and Table 2 shows the measurement result such as capacitance.

TABLE 1

| | First Solid Electrolyte Layer | Removal of Burr | Second Solid Electrolyte Layer |
|---|---|---|---|
| Example 1 | electrolytic polymerization | not performed | dispersion of polythiophene/ entire surface |
| Example 2 | electrolytic polymerization | performed | dispersion of polythiophene/ entire surface |
| Example 3 | electrolytic polymerization | performed | dispersion of polythiophene/ thinned portion |
| Example 4 | electrolytic polymerization | performed | solution of polyaniline/ entire surface |
| Comparative Example 1 | electrolytic polymerization | not performed | none |
| Comparative Example 2 | electrolytic polymerization | performed | none |
| Comparative Example 3 | chemical polymerization | not performed | none |
| Comparative Example 4 | chemical polymerization | not performed | dispersion of polythiophene/ entire surface |

TABLE 2

| | Capacitance (μF) | ESR (mΩ) | LC (μA) | Efficiency Percentage for Outer Dimension (%) |
|---|---|---|---|---|
| Example 1 | 331 | 23 | 57 | 74 |
| Example 2 | 332 | 22 | 13 | 98 |
| Example 3 | 330 | 25 | 26 | 97 |
| Example 4 | 331 | 24 | 14 | 98 |
| Comparative Example 1 | 333 | 30 | 100 | 76 |
| Comparative Example 2 | 330 | 30 | 130 | 98 |
| Comparative Example 3 | 338 | 41 | 120 | 98 |
| Comparative Example 4 | 339 | 38 | 118 | 97 |

The ESR was lower and the EC was also lower in Example 1 than those in Comparative Example 1. A possible reason for this is as follows. In Example 1, the second solid electrolyte layer is formed to cover the first solid electrolyte layer, and thus, an electrical short circuit between the anode body and the cathode layer in the thinned portion can be prevented. On the other hand, in Comparative Example 1, the second solid electrolyte layer is not formed, and thus, an electrical short circuit may occur between the anode body and the cathode layer in the thinned portion.

The ESR and the LC were both enhanced in Example 1 as compared with those in Comparative Example 1, whereas there was not much difference in the ESR and the LC between Comparative Example 3 and Comparative Example 4. A possible reason for this is as follows. In Example 1 and Comparative Example 1, the first solid electrolyte layer is formed by electrolytic polymerization, and thus, the burr could be formed at the first solid electrolyte layer. Therefore, by forming the second solid electrolyte layer to cover the first solid electrolyte layer, the ESR and the LC can be reduced. On the other hand, in Comparative Examples 3 and 4, the first solid electrolyte layer is formed by chemical polymerization, and thus, formation of the burr at the first solid electrolyte layer is not likely. Therefore, even if the second solid electrolyte layer is formed to cover the first solid electrolyte layer, it is difficult to reduce the ESR and the LC. Based on the above, the effect obtained by forming the second solid electrolyte layer to cover at least the thinned portion is more pronounced in the case of forming the first solid electrolyte layer by electrolytic polymerization than in the case of forming the first solid electrolyte layer by chemical polymerization.

The ESR was significantly lower and the LC was also significantly lower in Example 2 than those in Comparative Example 2. A possible reason for this is as follows. In Example 2, the second solid electrolyte layer is formed to cover the first solid electrolyte layer, and thus, an electrical short circuit between the anode body and the cathode layer in the thinned portion can be prevented. On the other hand, in Comparative Example 2, the second solid electrolyte layer is not formed although the burr is removed, and thus, an electrical short circuit occurs easily between the anode body and the cathode layer in the thinned portion.

The LC was lower in Examples 2 and 3 than that in Example 1. A possible reason for this is as follows. In Examples 2 and 3, the burr formed at the first solid electrolyte layer is removed, and thus, application of the external stress to the components (e.g., cathode terminal 19 shown in FIG. 1, and the like) of the solid electrolytic capacitor in the assembly step (e.g., terminal connection step, resin molding step or the like) is not likely. On the other hand, in Example 1, the burr formed at the first solid electrolyte layer is not removed, and thus, the components are easily subjected to the external stress in the aforementioned assembly step. In addition, the efficiency percentage for the outer dimension was higher in Examples 2 and 3 than that in Example 1. A possible reason for this is that the burr formed at the first solid electrolyte layer is removed in Examples 2 and 3, whereas the burr is not removed in Example 1. This holds true for the result that the efficiency percentage for the outer dimension was higher in Comparative Example 2 than that in Comparative Example 1.

The ESR was lower and the LC was also lower in Example 2 than those in Example 3. A possible reason for this is as follows. In Example 2, the second solid electrolyte layer is formed to cover the first solid electrolyte layer, and thus, the second solid electrolyte layer covers the thinned portion inevitably. In addition, the total thickness of the solid electrolyte layer can be ensured.

The ESR was lower and the LC was also lower in Example 3 than those in Comparative Example 2. A possible reason for this is as follows. In Example 3, the second solid electrolyte layer is formed to cover the first solid electrolyte layer, and thus, an electrical short circuit between the anode body and the cathode layer in the thinned portion can be prevented. On the other hand, in Comparative Example 2, the second solid electrolyte layer is not formed, and thus, an electrical short circuit may occur between the anode body and the cathode layer in the thinned portion.

In Example 3, the second solid electrolyte layer is formed to cover only the thinned portion, and thus, the manufacturing cost can be reduced as compared with Example 2 and the like.

The result similar to that of Example 2 was obtained in Example 4 as well. This shows that even when polyaniline is used as the second solid electrolyte layer, the effect similar to the effect produced in the case of using PEDOT as the second solid electrolyte layer is obtained.

The LC was further higher in Comparative Example 2 than that in Comparative Example 1. A possible reason for this is as follows. The burr is not removed in Comparative Example 1, whereas the burr is removed in Comparative Example 2. Therefore, a probability of formation of the thinned portion is higher in Comparative Example 2 than in Comparative Example 1.

The ESR was further higher and the LC was also further higher in Comparative Example 3 than those in Comparative Example 1. A possible reason for this is as follows. The first solid electrolyte layer is formed by electrolytic polymerization in Comparative Example 1, whereas the first solid electrolyte layer is formed by chemical polymerization in Comparative Example 3. Therefore, denser first solid electrolyte layer can be formed in Comparative Example 1 than in Comparative Example 3.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor, comprising:
   an anode body;
   a dielectric coating formed to cover said anode body;
   a first solid electrolyte layer formed to cover said dielectric coating;
   a second solid electrolyte layer made of a conductive polymer and formed to cover a relatively thin portion of said first solid electrolyte layer; and
   a cathode layer formed to cover said first solid electrolyte layer and said second solid electrolyte layer, wherein
   said second solid electrolyte layer is formed by causing a dispersion that has particles of said conductive polymer dispersed therein, a dispersion that has aggregates of said conductive polymer dispersed therein, or a solution that has said conductive polymer dissolved therein, to adhere to the relatively thin portion of said first solid electrolyte layer.

2. The solid electrolytic capacitor according to claim 1, wherein
   said anode body has a first end and a second end opposite to each other,
   an anode lead is erected on said first end of said anode body, and
   said second solid electrolyte layer is formed to cover said second end side of said anode body as the relatively thin portion of said first solid electrolyte layer.

3. The solid electrolytic capacitor according to claim 1, wherein
   said second solid electrolyte layer is formed to cover the whole of said first solid electrolyte layer.

4. The solid electrolytic capacitor according to claim 1, wherein
   said second solid electrolyte layer includes polythiophene.

5. The solid electrolytic capacitor according to claim 1, wherein
   said first solid electrolyte layer is formed by electrolytic polymerization.

6. The solid electrolytic capacitor according to claim 1, wherein
   said first solid electrolyte layer includes polypyrrole.

7. A method for manufacturing a solid electrolytic capacitor, comprising the steps of:
   forming an anode body;
   forming a dielectric coating to cover said anode body;
   forming a first solid electrolyte layer to cover said dielectric coating;
   forming a second solid electrolyte layer made of a conductive polymer, to cover a relatively thin portion of said first solid electrolyte layer; and
   forming a cathode layer to cover said first solid electrolyte layer and said second solid electrolyte layer, wherein
   said step of forming a second solid electrolyte layer includes a step of forming said second solid electrolyte layer by causing a dispersion that has particles of said conductive polymer dispersed therein, a dispersion that has aggregates of said conductive polymer dispersed therein, or a solution that has said conductive polymer dissolved therein, to adhere to the relatively thin portion of said first solid electrolyte layer.

8. The method for manufacturing a solid electrolytic capacitor according to claim 7, wherein
said step of forming a first solid electrolyte layer includes a step of forming the conductive polymer by electrolytic polymerization.

9. A method for manufacturing a solid electrolytic capacitor, comprising the steps of:
forming an anode body;
forming a dielectric coating to cover said anode body;
forming a first solid electrolyte layer to cover said dielectric coating;
removing a burr produced at said first solid electrolyte layer;
forming a second solid electrolyte layer made of a conductive polymer, to cover a portion of said first solid electrolyte layer from which said burr was removed; and
forming a cathode layer to cover said first solid electrolyte layer and said second solid electrolyte layer.

10. The method for manufacturing a solid electrolytic capacitor according to claim 9, wherein
said step of forming a first solid electrolyte layer includes a step of forming the conductive polymer by electrolytic polymerization.

11. The method for manufacturing a solid electrolytic capacitor according to claim 9, wherein
said step of forming a second solid electrolyte layer includes a step of forming said second solid electrolyte layer by causing a dispersion that has particles of said conductive polymer dispersed therein, a dispersion that has aggregates of said conductive polymer dispersed therein, or a solution that has said conductive polymer dissolved therein, to adhere to the portion of said first solid electrolyte layer from which said burr was removed.

* * * * *